United States Patent [19]

Crowder

[11] 3,958,536
[45] May 25, 1976

[54] POULTRY CONVEYOR MEANS

[76] Inventor: Delphin F. Crowder, Rte. 7, Harrison, Ark. 72601

[22] Filed: Apr. 22, 1975

[21] Appl. No.: 570,485

[52] U.S. Cl. ............................................. 119/82
[51] Int. Cl.² ....................................... A01K 29/00
[58] Field of Search .............. 119/82; 198/39, 165; 214/512

[56] References Cited
UNITED STATES PATENTS

| | | | |
|---|---|---|---|
| 3,672,335 | 6/1972 | Sanders | 119/82 |
| 3,718,118 | 2/1973 | Bibler | 119/82 X |
| 3,722,477 | 3/1973 | Weldy et al. | 119/82 |

Primary Examiner—Hugh R. Chamblee
Attorney, Agent, or Firm—Zarley, McKee, Thomte, Voorhees & Sease

[57] ABSTRACT

A poultry conveyor means is disclosed herein and comprises a starting ramp conveyor which is adapted to be positioned in a poultry house or the like and which is adapted to convey poultry onto a second conveyor. A decoy cage is positioned at one side of the second conveyor to encourage the poultry to move onto the conveyor. The second conveyor is pivotally connected to a third conveyor which extends upwardly therefrom and which has its upper end pivotally and rotatably connected to a pedestal which extends upwardly from a trailer or the like. A fourth conveyor is also pivotally and rotatably connected to the upper end of the pedestal and extends outwardly therefrom. A fifth conveyor is slidably and rotatably secured to the outer end of the fourth conveyor and has a hood at the outer end thereof which is adapted to facilitate the positioning of the poultry into coops on a coop truck or the like. The operation of the conveyors may be controlled by a person on the coop truck by means of a control box provided at the outer end of the fifth conveyor. The connection of the various conveyors permits the conveyors to be selectively positioned with respect to the poultry house and the coop truck so that the poultry will be conveyed along the various conveyors upwardly to the coop truck. The conveyors may be stored on the trailer to permit the entire apparatus to be easily transported from one location to another location.

16 Claims, 7 Drawing Figures

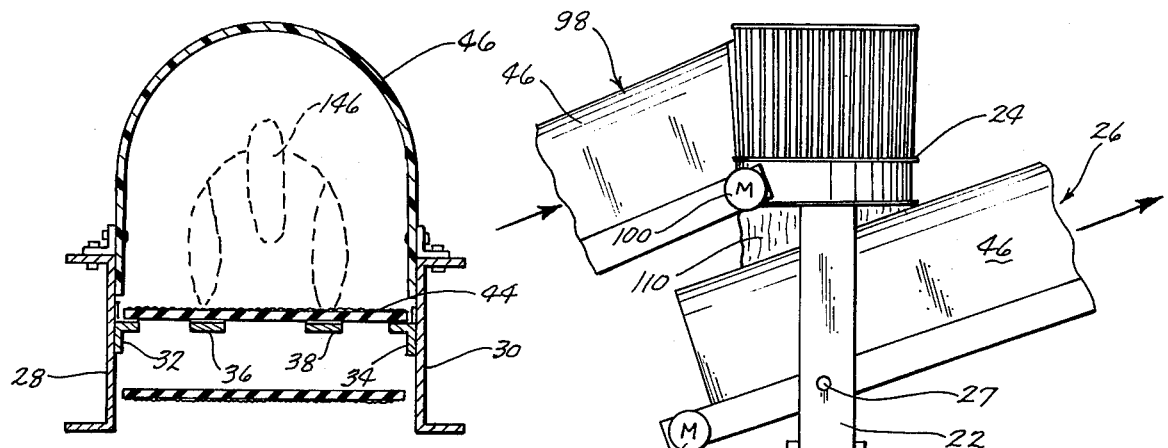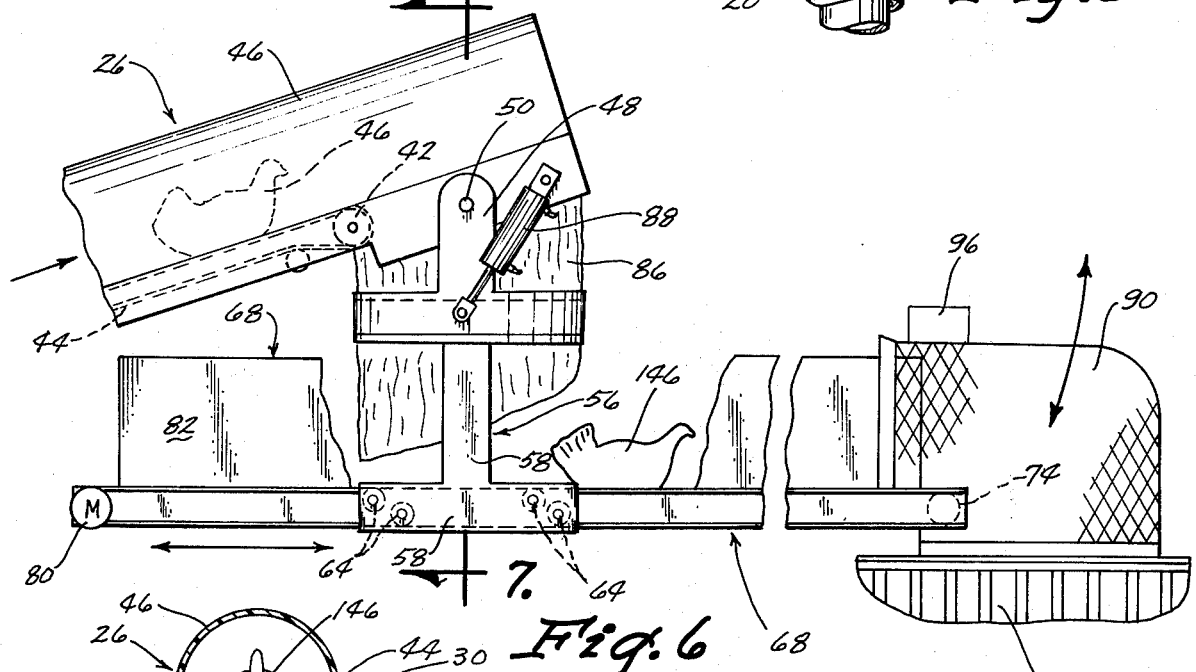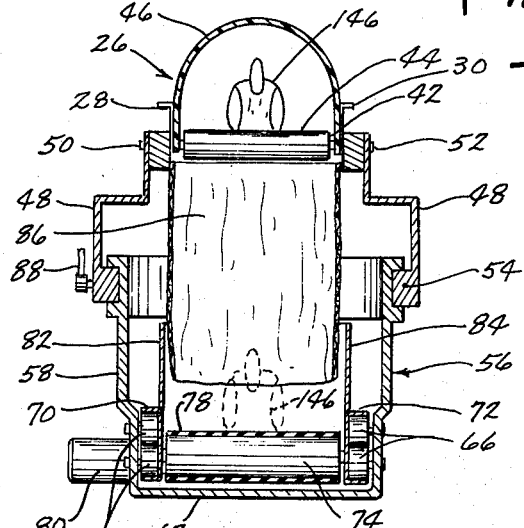

3,958,536

POULTRY CONVEYOR MEANS

BACKGROUND OF THE INVENTION

Many attempts have been made to provide a convenient means for loading poultry such a chickens or the like onto trucks having chicken coops thereon. Applicant previously patented a poultry conveyor means and the previous device disclosed in U.S. Pat. No. 3,805,743 represented a significant advance in the art. The present invention represents a significant improvement over applicant's earlier device in that a decoy cage is provided to encourage the chickens to enter onto the conveyor. The present invention also represents an improvement in applicant's earlier device in that the discharge conveyor is designed to enable it to be easily moved across the width of a truck bed to facilitate the insertion of the chickens into the various coops on the coop truck.

Therefore, it is a principle object of this invention to provide a poultry conveyor means.

A further object of the invention is to provide a poultry conveyor means which has several conveyors pivotally secured together to permit the conveyors to be selectively positioned with respect to poultry houses or the like.

A further object of the invention is to provide a poultry conveyor means including a discharge conveyor which may be pivotally, rotatably and slidably mounted with respect to the adjacent conveyor so that the chickens may be easily placed in coops on the coop truck.

A further object of the invention is to provide a poultry conveyor means including a decoy cage for decoying the chickens or the like onto the starting conveyor.

A further object of the invention is to provide a poultry conveyor means which may be easily transported from one location to another location.

A further object of the invention is to provide a poultry conveyor means which may be remotely controlled from the top of the coop truck.

A further object of the invention is to provide a poultry conveyor means whick is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which;

FIG. 4 is a sectional view as seen on lines 4—4 of FIG. 3;

FIG. 5 is a side elevational view of the support post and the conveyors connected thereto;

FIG. 6 is a side elevational view of the discharge conveyor and chute; and

FIG. 7 is a sectional view as seen on lines 7—7 of FIG. 6.

DESCRIPTION OF THE PREFERRED EMBODIMENT

Figure 1:
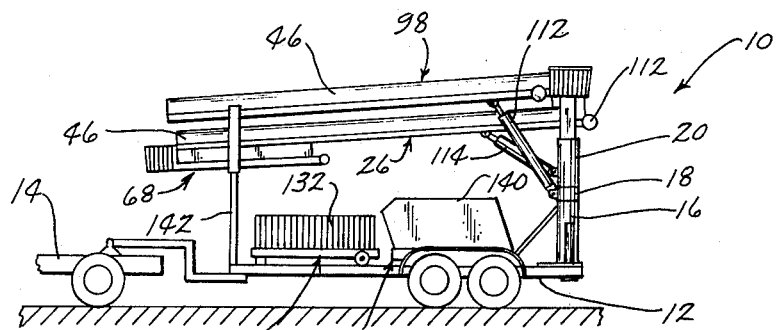
FIG. 1 is a side view of the poultry conveyor means of this invention with the conveyors stacked on the trailer.
Figure 2:
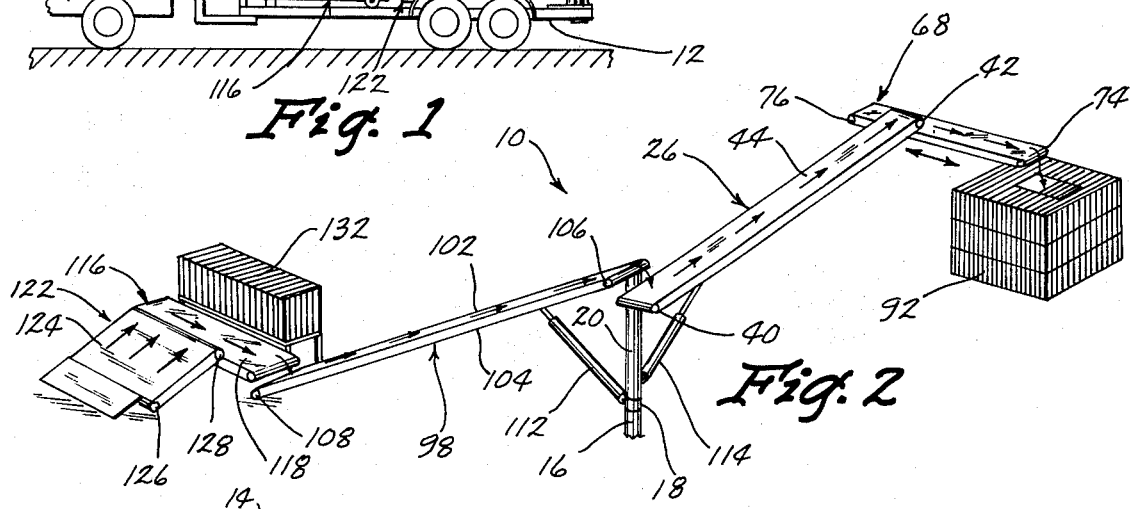
FIG. 2 is a schematic view of the various conveyors forming the invention.

The poultry conveyor of this invention is referred to generally by the reference numeral 10 and may be mounted on a truck, trailer or some other type of support. The drawings illustrate the conveyor 10 as being mounted on a trailer which is pulled by a truck 14.

A pedestal or support post 16 extends upwardly from the rear of trailer 12 and generally has a pair of sleeves 18 and 20 rotatably mounted thereon by any convenient means. A U-shaped member 22 extends upwardly from sleeve 20 and has a ring-shaped support 24 mounted on the upper end thereof.

Conveyor 26 has one end positioned within member 22 and is pivotally connected thereto about a horizontal axis generally referred to by the reference numeral 28. Conveyor 26 comprises spaced aprt side frame members 28 and 30 having suitable braces or the like extending therebetween (not shown). Conveyor 26 also includes inwardly extending belt supports 32 and 34(FIG. 4) and longitudinally extending belt supports 36 and 38. Conveyor 26 is provided with conventional belt rollers 40 and 42 at its opposite ends which support a conveyor belt 44 extending therearound. Preferably, a transparent shield or cover 46 extends over the conveyor belt for the length thereof such as illustrated in FIG. 4.

As illustrated in FIG. 7, a support 48 is pivotally secured to conveyor 26 adjacent the upper end thereof at 50 and 52 and extends downwardly therefrom. The lower end of support 48 is ring-shaped and includes an annular shoulder 54 extending inwardly from the lower end thereof as illustrated in FIG. 7. A ring-shaped support member 56 is rotatably mounted on the shoulder 54 and extends downwardly therefrom. For purposes of description, support 56 will be described as comprising downwardly extending legs 58 and 60 which are joined at their lower ends by brace 62. Rollers 64 are rotatably secured to leg 58 and rollers 66 are rotatably secured to the lower end of leg 60 as illustrated in FIG. 7.

Conveyor 68 is longitudinally movably mouned with respect to the support 56 in the manner illustrated in FIG. 7. Conveyor 68 includes a pair of side frame members in the form of channels 70 and 72 which receive the rollers 64 and 66 respectively (FIG. 7) to permit the conveyor 68 to be moved with respect to the support 56 as illustrated by the arrows in FIG. 6. Conveyor 68 is provided with rollers 74 and 76 at the opposite ends of the channels 70 and 72 for supporting the conveyor belt 78 in conventional fashion. A hydraulic motor 80 is operatively connected to the roller 76 for controlling the operation of the conveyor belt 78. A pair of side walls 82 and 84 extend upwardly from the channels 70 and 72 respectively to aid in maintaining the poultry on the conveyor. The numeral 86 refers to a flexible chute which extends downwardly from the discharge end of the conveyor 26 between the sidewalls 82 and 84 as illustrated in FIG. 7 to facilitate the poultry being transferred from the conveyor 26 to the conveyor 68. A hydraulic cylinder 88 is pivotally connected to frame member 28 and the support 48 as seen in FIG. 6 so that actuation of the hydraulic cylinder 88 causes the support 48 and the conveyor 68 to be pivotally moved about 50 and 52 with respect to the conveyor 26. The numeral 90 refers to a discharge hood which is provided at the outer end of the conveyor 68 to facilitate the poultry being deposited downwardly from the conveyor into a coop 92 positioned on a coop truck referred to generally by the reference numeral 94. The numeral 96 refers generally to a control box positioned on the chute 90 to permit the operator positioned on the coop truck to control the operation of the various conveyors and hydraulic cylinders.

Conveyor 90 is rotatably mounted at its upper end to the support 24 and has the same construction as the conveyor 26. Hydraulic motor 100 is provided on the upper end of conveyor 98 for powering the conveyor belt 104 which extends between and around rollers 106 and 108. Conveyor 98 is provided with a chute 110 at its upper end which extends downwardly through the shield 46 of conveyor 26 so that the poultry will be conveyed from conveyor 98 downwardly onto the conveyor 26. Conveyor 98 is rotatably mounted on the support 24 by any convenient means such as the means of rotatably connecting conveyors 26 and 68. Hydraulic cylinder is pivotally connected at its lower end to sleeve 18 and is pivotally connected at its rod end to the conveyor 98 to permit the conveyor 98 to be pivotally moved about a horizontal axis at its upper end which is defined generally by the motor 100. A hydraulic cylinder 114 is pivotally connected at its lower end to sleeve 20 and is pivotally connected at its rod end to conveyor 26 to permit the conveyor 26 to be pivotally moved with respect to the support 22 about 27.

The numeral 116 refers to a conveyor which is pivotally connected to the lower end of conveyor 98 by any convenient means. Conveyor 116 includes a conveyor belt 118 which is powered by a hydraulic motor 120 in conventional fashion. The numeral 122 refers to a starting conveyor comprising a conveyor belt 124 which extends around and between rollers 126 and 128. Conveyor 124 is powered by a conventional hydraulic motor 130 in conventional fashion. The starting conveyor 122 is preferably detachably connected to the conveyor 116 by any convenient means so that it may be positioned at either side of the conveyor 116 as required depending upon the construction of the poultry house. The numeral 132 refers to a decoy cage which is preferably detachably connected to the conveyor 116 as required. For purposes of description, the numerals 134, 136 and 138 refer to poultry houses containing the poultry to be conveyed.

In FIG. 1, the numeral 140 identifies a conventional power plant adapted to supply hydraulic fluid under pressure to the various hydraulic motors and hydraulic cylinders on the device. The precise circuitry of the various hydraulic motors and hydraulic cylinders is not critical to this invention except that the various cylinders and motors are controlled by the control box 96 or by a suitable control box located adjacent to the power plant 140.

FIG. 1 illustrates the decoy cage 132 and the starting conveyor 122 being stored on the trailer bed during periods of transport. In FIG. 1, the numeral 142 denotes a support stand which extends upwardly from the trailer 12 for supporting the ends of the conveyors as shown.

The method of operating the poultry conveyor means of this invention is as follows. The conveyors 26, 68 and 98 would normally be stored on the trailer 12 in the manner illustrated in FIG. 1 by means of the support 142. Normally, the cage 132 and conveyor 122 would be positioned on the bed of the trailer for transport purposes. When it is desired to load poultry from poultry house 134, the truck 14 is driven to the position illustrated by solid lines in FIG. 3. The truck 14 may also be driven to the position illustrated by broken lines in FIG. 3 since the pivotal and rotatable connections between the conveyors makes such positioning possible.

Figure 3:
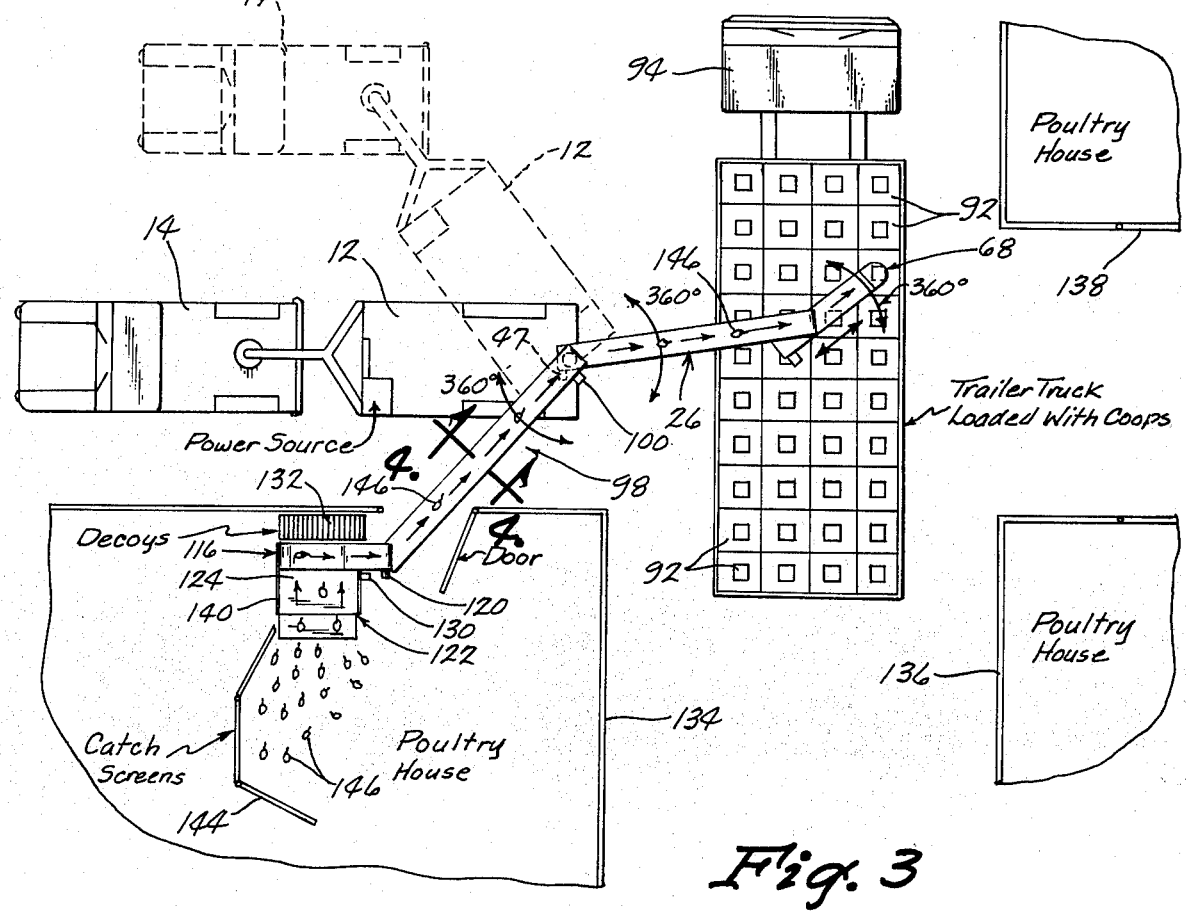
FIG. 3 is a plan view illustrating the invention being used to convey poultry from a poultry house to a coop truck.

The door on poultry house 134 is first opened and the hydraulic cylinders 114 and 112 are actuated to position the conveyors as illustrated in FIG. 3. Once the cylinders 112 aand 114 have been extended to raise the ends of the conveyors from the support 142, the conveyors may be manually rotated with respect to each other and with respect to post 16 to permit the precise positioning of the conveyors. If desired, the trailer 12 can be maneuvered to cause the lower end of conveyor 98 to be extended through the door of poultry house 134. Conveyors 116 and 122 are then positioned as illustrated in FIG. 3. Catch screens 144 are then positioned to aid in guiding the chickens 146 towards the conveyor 122. If needed, a ramp 148 may also be used to aid in introducing the chickens onto the conveyor 122. Chickens are placed in the decoy cage and the chickens in the poultry house 134 are attracted to those decoy chickens. In moving towards the decoy chickens, the poultry house chickens move onto conveyor 122 which conveys the chickens onto conveyor 116 which conveys the chickens onto conveyor 98. Conveyor 98 conveys the chickens upwardly and drops the chickens downwardly through chute 110 onto conveyor 26.

Conveyor 26 conveys the chickens upwardly until they are dropped downwardly onto the discharge coveyor 68. The chickens are conveyed outwardly over the top of coop truck 94. The operator on top of the coops 92 can control the operation of the various conveyors, motors and cylinders by means of the control box located on chute 90. The operator is able to position the chute 90 directly over the proper coop 92 by slidably moving the conveyor 68 either inwardly or outwardly with respect to support 56. The conveyor 68 may also be rotated with respect to support 48 to further position the chute 90 in the desired location relative to the coops 92. If further adjustment or movement is required, the cylinder 88 may be actuated to tilt or pivot the conveyor 68 relative to the conveyor 26.

The construction of the conveyors is such that precise positioning of the same is possible in a convenient manner. The construction of the conveyors also insures that the poultry will be maintained on the device without being injured. Thus it can be seen that a novel poultry conveyor device has been provided which is easily maneuvered to conveniently convey poultry from a poultry house onto a coop truck. When the poultry have been removed from the house 134, the device can easily be moved so that poultry houses 136 and 138 may be emptied.

Thus, it can be seen that the device accomplishes at least all of its stated objectives.

I claim:
1. A poultry conveyor means comprising,
a portable frame means,
a first support means mounted on said frame means and extending upwardly therefrom,
a first poultry conveyor means rotatable and pivotally mounted at one end thereof to said first support means and normally extending downwardly therefrom,
a second poultry conveyor means rotatably and pivotally mounted at one end thereof to said first support means and normally extending upwardly therefrom, means for transferring the poultry from said one end of said first poultry conveyor means to said one end of said second poultry conveyor means, first means at the other end of said first poultry conveyor means for moving the poultry onto said first poultry conveyor means, second means at the other end of said second poultry conveyor means for discharging the poultry into coops, and means for maintaining said poultry on said first and second poultry conveyor means.

2. The structure of claim 1 wherein said first means comprises a poultry decoy cage at the other end of said first poultry conveyor means.

3. The structure of claim 1 wherein said first means comprises a third poultry conveyor means pivotally connected to said other end of said first poultry conveyor means.

4. The structure of claim 3 wherein said first means comprises a poultry decoy cage adjacent said other end of said first poultry conveyor means.

5. The structure of claim 1 wherein said second means comprises a discharge conveyor means slidably mounted at said other end of said second poultry conveyor means.

6. The structure of claim 5 wherein said discharge conveyor means is also rotatably mounted with respect to said second poultry conveyor means.

7. The structure of claim 6 wherein said discharge conveyor means is also pivotally mounted with respect to said second poultry conveyor means.

8. The structure of claim 7 wherein a hydraulic cylinder means is pivotally connected to said second poultry conveyor means and said discharge conveyor means for selectively pivotally moving said discharge conveyor means relative to said second poultry conveyor means.

9. The structure of claim 5 wherein a hood-like chute is provided at the discharge end of said discharge conveyor means.

10. The structure of claim 5 wherein a control means is provided on said discharge conveyor means for controlling the operation of said first and said second poultry conveyor means and said discharge conveyor means.

11. The structure of claim 1 wherein said means transferring the poultry from said one end of said first poultry conveyor and said one end of said second poultry conveyor means comprises a chute means.

12. The structure of claim 1 wherein said portable frame means comprises a trailer.

13. The structure of claim 12 wherein said first support means is positioned on said trailer at the rearward end thereof, and a second support means on the forward end of said trailer for supporting the other ends of said first and second poultry conveyor means for transport purposes.

14. The structure of claim 1 wherein said first means comprises a third conveyor means movably connected to said second poultry conveyor means and a starting conveyor means movable mounted with respect to said third conveyor means.

15. The structure of claim 1 wherein a hydraulic cylinder means is pivotally secured to and extends between said first poultry conveyor means and said first support means for selectively pivotally moving said first poultry conveyor means relative to said first support means.

16. The structure of claim 15 wherein a hydraulic cylinder means is pivotally secured to and extends between said second conveyor means and said first support means for selectively pivotally moving said second poultry conveyor means relative to said first support means.

* * * * *